United States Patent
Day

[15] 3,677,261
[45] July 18, 1972

[54] IMPEDANCE PNEUMOGRAPH

[72] Inventor: Christopher C. Day, Newtonville, Mass.

[73] Assignee: American Optical Corporation, Southbridge, Mass.

[22] Filed: April 3, 1970

[21] Appl. No.: 25,353

[52] U.S. Cl. .................................. 128/2.1 Z, 307/231, 330/145
[51] Int. Cl. .................................................. A61b 5/05
[58] Field of Search ............... 128/2.05 R, 2.1 R, 2.1 Z; 307/231, 263; 330/145, 138

[56] References Cited

UNITED STATES PATENTS

| | | | |
|---|---|---|---|
| 3,433,217 | 3/1969 | Rieke | 128/2.1 Z |
| 3,545,429 | 12/1970 | Pelta et al. | 128/2.1 Z |
| 3,449,686 | 6/1969 | Bladen | 330/29 |
| 2,861,239 | 11/1958 | Gilbert | 73/359 X |
| 3,003,115 | 10/1961 | Stull, Jr. | 330/138 X |
| 3,149,627 | 9/1964 | Bagno | 128/2.1 Z |
| 3,340,867 | 9/1967 | Kubicek et al. | 128/2.1 Z |
| 3,537,025 | 10/1970 | Baum et al. | 330/138 X |

OTHER PUBLICATIONS

The Electronic Engineer, Oct. 1967, pp. 32–33

*Primary Examiner*—Kyle L. Howell
*Attorney*—William C. Nealon, Noble S. Williams and Robert J. Bird

[57] ABSTRACT

An impedance pneumograph, utilizing the change in thoracic impedance due to respiration to amplitude modulate a fixed amplitude electrical carrier signal applied to the thorax of a mammalian subject, wherein the modulation provides breathing rate information for monitoring purposes. A gain stabilizer circuit is provided to automatically adjust the gain when the carrier component deviates from a predetermined voltage range, to be insensitive to fluctuations of the carrier component when it does not deviate from that predetermined range, and to be unresponsive to the modulation signal.

11 Claims, 3 Drawing Figures

PATENTED JUL 18 1972

INVENTOR.
CHRISTOPHER C. DAY

BY William C. Nedler
ATTORNEY

IMPEDANCE PNEUMOGRAPH

BACKGROUND

In the rapidly growing field of medical-electronics, there is a continual need for more reliable and accurate measurements of breath rate of a human being. This invention relates to apparatus known as an impedance pneumograph, for monitoring and making measurements of breath rate.

An impedance pneumograph is a device which monitors a person's respiration by sensing the change in electrical impedance of the person's thorax due to respiration or breathing. This apparatus is typically used in a hospital, or convalescent home, on a bed-ridden patient where the monitored respiration is generally displayed on a breath rate meter, indicating breaths per minute.

Prior breath rate monitoring techniques have utilized impedance pneumograph apparatus comprised of a pair of electrodes attached to the skin surface of a human being near the thoracic cavity region. These electrodes conduct current through the cavity in response to a source of electrical power conductively connected therebetween. The power source is usually a constant source of alternating current.

The thorax presents an electrical impedance to the electrodes which consists of two impedance components — a relatively steady value of thoracic impedance herein known as mean thoracic impedance; and a varying value of thoracic impedance, herein known as respirative impedance due to the change in the cavity volume because of respiration. The constant current being conducted through the cavity multiplied by the total impedance gives the voltage between the electrodes. There are two voltage components - one steady voltage component resulting from the mean thoracic impedance and one varying voltage component resulting from the respirative impedance.

The signal of interest is the varying voltage component, and various signal processing techniques to obtain this signal, can be employed. Prior art methods of signal processing include such well-known techniques in the electrical measurement art as: balancing out the steady component of thoracic voltage with another source of voltage using a manually controlled potentiometer; or rectifying the total thoracic voltage and comparing with a manually controlled D.C. reference voltage in a D.C. differential amplifier; or balancing out the unwanted steady component of thoracic voltage in a bridge circuit; or utilizing the inherent modulating characteristic of thorax movement to amplitude modulate the applied signal and then de-modulate. Respiration information extracted by these various schemes can be displayed on a number of information read-out devices including chartpaper recorders, digital and/or analog breath rate meters, oscilloscopes, etc.

For example, U.S. Pat. No. 3,340,867 discloses an impedance plethysmograph, for the measurement of cardiac output which can be readily adapted to measure breath rate. It incorporates a manually operated potentiometer to balance out the unwanted steady voltage. Another U.S. Pat. No. 3,149,627 discloses a plethysmograph for measurement of blood flow, also adaptable to breath rate measurement, which uses a modified Kelvin double bridge circuit for balancing out the unwanted steady voltage. Background information disclosed in these patents is incorporated herein by reference.

There are many problems, associated with the presently available technique for monitoring respiration. These problems are caused by large variations in mean thoracic impedance from one patient to another. These problems are also caused by large changes in mean thoracic impedance of the same thorax of a person, due to motion of that person, as when turning over in bed.

For example, in the modulation approach to signal processing, in which de-modulation, A.C. coupling, D.C. amplification, and signal squaring are needed, large variations in mean thoracic impedance, on the order of 5:1, require that a demodulator be designed to function over a large dynamic range. Since the depth of modulation, or the ratio of the modulation voltage component to the carrier voltage component is very small, the large dynamic range requirement complicates the demodulator design.

Also these large variations in mean thoracic impedance in combination with an A.C. coupling network produce a "dead time" during which the D.C. amplifier is recovering from saturation giving erroneous readings. This "dead time" is quite long because of the necessarily large time constant of the A.C. coupling network.

The obvious disadvantages of the other signal processing techniques is that in addition to the above problems, a manual re-balancing is necessary to compensate for large mean thoracic impedance changes.

A solution to these problems of re-balancing, saturation, and dead time is some form of gain control. However, conventional AGC (automatic gain control) is inapplicable. In a conventional AGC system the error correction time and the frequency of the signal of interest are related. The error correction time must exceed the period of the signal of interest. A conventional AGC loop must have a time constant much longer than the longest period of useful information derived from the patient, otherwise the information signal itself may look like a varying carrier amplitude. Such an AGC loop with its inherent "hunting" characteristic applied to this problem of gain stabilization would produce unacceptably long settling times.

1. It is thus an object of this invention to provide an improved impedance pneumograph.

2. An additional object of this invention is to provide an improved impedance pneumograph which will make measurements of breath rate that are more accurate and reliable than those made with existing impedance pneumograph instrumentation.

3. It is a further object of this invention to provide a gain control which will limit the dynamic range requirement of associated circuitry, thereby simplifying the design therefor.

4. It is a still further object of this invention to provide a gain control which will solve the manual re-balance, dead time, and saturation problems due to motion of the patient.

5. It is yet another object of this invention to provide a solution to the respiration monitoring problems which exist when a number of patients are being monitored in succession by the same impedance pneumograph.

6. And yet an additional object of this invention is to provide an instantaneous gain compensation when the patient's mean thoracic impedance changes, independent of the frequency of the modulation signal.

BRIEF DESCRIPTION

According to this invention, the gain stabilizer circuitry is positioned between the output of the D.C. amplifier and the input to the alternating voltage amplifier. The circuitry monitors the output voltage of the D.C. amplifier — normally a D.C. voltage which fluctuates in response to the patient's inhalation and exhalation. The circuitry applies a gain correction, when required, to the input signal at the alternating voltage amplifier.

The gain stabilizer is comprised of a fixed resistive voltage divider, connected between sources of potential equal in value but opposite in polarity. In parallel with a portion of this divider are two series diodes, reverse biased by virtue of their orientation with respect to the two sources of potential. The D.C. amplifier output is connected to the voltage divider.

The point common to both diodes is connected to one end of a resistor, the opposite end of the resistor being connected to a capacitor and also to the gate electrode of a field effect transistor (FET). The voltage on the capacitor is thereby applied to the gate electrode, and controls the field effect transistor's drain electrode to source electrode resistance. The voltage on the capacitor is constant unless charged or discharged through the diodes; the capacitor does not discharge through the FET because of the essentially infinite input impedance of its gate electrode. The other side of the capacitor is grounded as is the source electrode of the field effect transistor. The drain electrode of the FET is connected to a fixed resistor so that the result of the FET's effective resistance variation is to establish a variable voltage divider therewith. The common point to the fixed resistor and the FET drain electrode is connected to the input of the alternating voltage amplifier.

When current flows through either one of the diodes, the flow is due only to a significant change in mean thoracic impedance. In response to a particular D. C. amplifier output signal which tends to deviate from the predetermined voltage range established by the values of resistors in the fixed voltage divider, the voltage on the capacitor either increases or decreases. This capacitor voltage change varies the source to drain resistance of the FET, which changes the resistance ratio of the variable voltage divider, thereby changing the input signal to the alternating voltage amplifier in such a direction as to compensate for the mean thoracic impedance change. The gain correction is made in a fraction of a second, and is not subject to the long stabilizing constants of an ordinary low frequency AGC circuit.

When the current does not flow through either of the diodes during pneumographic operation, the gain compensation circuit is functionally disconnected from the remaining circuitry by those diodes. This functional disconnection can be described as circuit operation in an "open-loop" mode.

DRAWINGS

DETAILED DESCRIPTION

In order to more lucidly illustrate the improved operation of the preferred embodiment, a description of a particular embodiment of the prior art is first presented.

PRIOR ART

Figure 1:
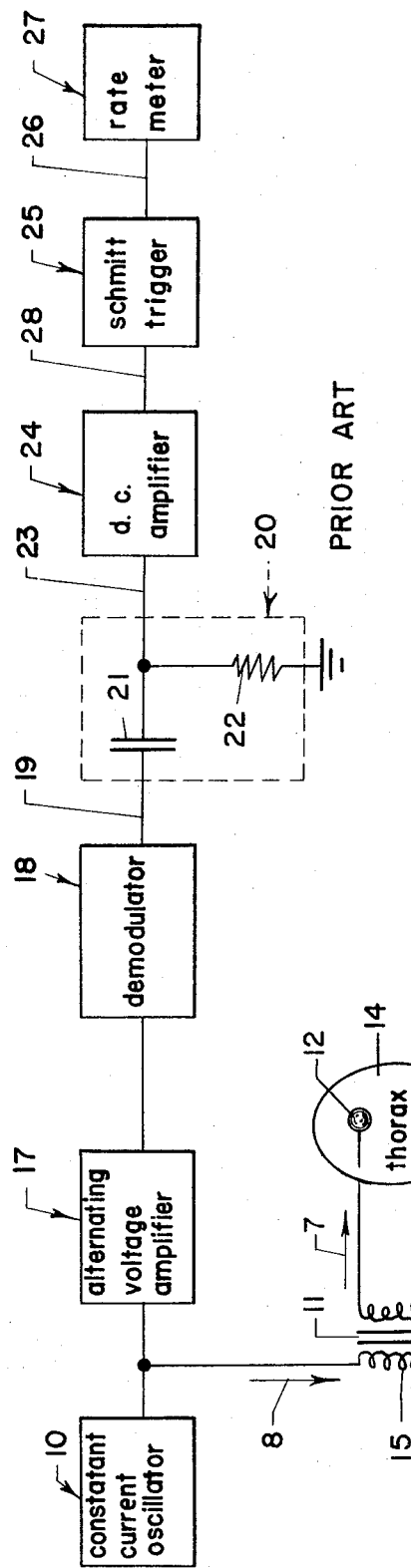
FIG. 1 is a block diagram of the prior art showing an impedance pneumograph without gain compensation.

Prior monitoring techniques as shown in FIG. 1 have utilized an oscillator 10 with a constant current output which is transformer-coupled by transformer 11 to two electrodes 12 and 13 that are placed opposite each other on the mammalian thorax 14. The thorax 14 of any mammalian subject, and of any living creature that breathes, will have both a relatively constant value of impedance known as "mean thoracic impedance", and a varying value of impedance because of expansion and contraction of the thoracic cavity due to respiration. In a given human being, typical values of mean thoracic impedance range around 150 ohms, and typical values of varying impedance range around 0.6 ohms. These values are not to be taken as representative of all humans, but are guidelines and are intended to be illustrative of the fact that the ratio of mean impedance to varying impedance is high, and may be on the order of 250:1. The reflected impedance of the thorax, due to transformer action, multiplied by the constant current 8 in the primary winding 15 determines the amplitude of voltage on the primary side of the transformer 11. This modulated primary voltage is amplified, in an alternating voltage amplifier 17 to be described.

Since the current 7 passing through the patient is kept small for safety reasons (about 30 μa rms), the resulting voltage signal corresponding to respiration must be amplified in an alternating voltage amplifier 17 to increase it to a reasonable level for processing. The output of this amplifier is then de-modulated in de-modulator 18 using ordinary A.M. de-modulation techniques in order to extract the respiration information. The de-modulated signal on conductor 19 consists of a small incremental voltage superimposed on a large D.C. voltage, the ratio between the two signals possibly being on the order of 1:250. The large D.C. voltage is proportional to the mean thoracic impedance, and the small incremental voltage is proportional to the change in thoracic impedance produced by breathing.

The large D.C. voltage is unwanted. It is usually removed by A.C. coupling through a network 20 consisting of a capacitor 21 and resistor 22 to bring the D.C. voltage level to zero on electrical conductor 23, passing only the small incremental voltage. The time constant of A.C. coupling network 20 must be very long, since human beings at rest, as in a hospital bed, can breathe as slowly as 5 breaths per minute. Otherwise, the incremental voltage or modulation signal could be distorted or significantly attenuated by a coupling network 20 having a time constant which is too small.

In general, large unwanted D.C. voltages can be removed by means other than the A.C. coupling network 20. For example, threshold detection (not shown in FIG. 1) is an alternative technique, but it requires a sensitive setting of the threshold voltage to a value corresponding to the average de-modulated carrier voltage. This setting allows the modulation signal to pass. Therefore, the use of a threshold detector necessitates incorporation of gain control so as to maintain the average de-modulated carrier voltage constant thereby permitting proper operation of the pneumograph. A threshold detector is used in the instant invention and will be discussed later, in the description of the instant invention.

The prior art pneumograph presently being described, as well as others, does not utilize gain control or stabilization. Therefore it requires an A.C. coupling network such as network 20, which works with variable carrier levels and reduces the average D.C. voltage level to zero on conductor 23, passing only the modulation signal or small incremental voltage.

The small incremental voltage is then amplified in a D.C. amplifier 24, and conducted on lead 28 to a Schmitt trigger circuit 25 to convert the cyclic breathing waveform into a square wave. The Schmitt trigger output 26 feeds a standard rate meter 27 which incorporates a one-shot multivibrator (not shown). The one-shot converts the Schmitt output 26 to a constant pulse width. Then, rate meter 27 performs an averaging function on the constant pulse width, and displays the breathing subject's or patient's mean breathing rate.

If the patient, being monitored in bed, happens to roll over causing a doubling of the value of the mean thoracic impedance as sensed by electrodes 12 and 13 attached to his body, the D.C. voltage from the de-modulator 18 will double. This voltage increase will be coupled through the A.C. coupling network 20 consisting of capacitor 21 and resistor 22, and will saturate the D.C. amplifier 24 resulting in "dead time" until the capacitor 21 effectively reduces the D.C. voltage at the input 23 to the D.C. amplifier 24 to a normal operating level. However, even if the thoracic impedance change was not large enough to cause saturation of the D.C. amplifier 24, a substantial impedance change could still cause the output level of D.C. amplifier 24 to fall outside the voltage range required for proper operation of the Schmitt trigger 25. Schmitt trigger malfunction results in "dead time", as before.

PRESENT INVENTION

Figure 2:
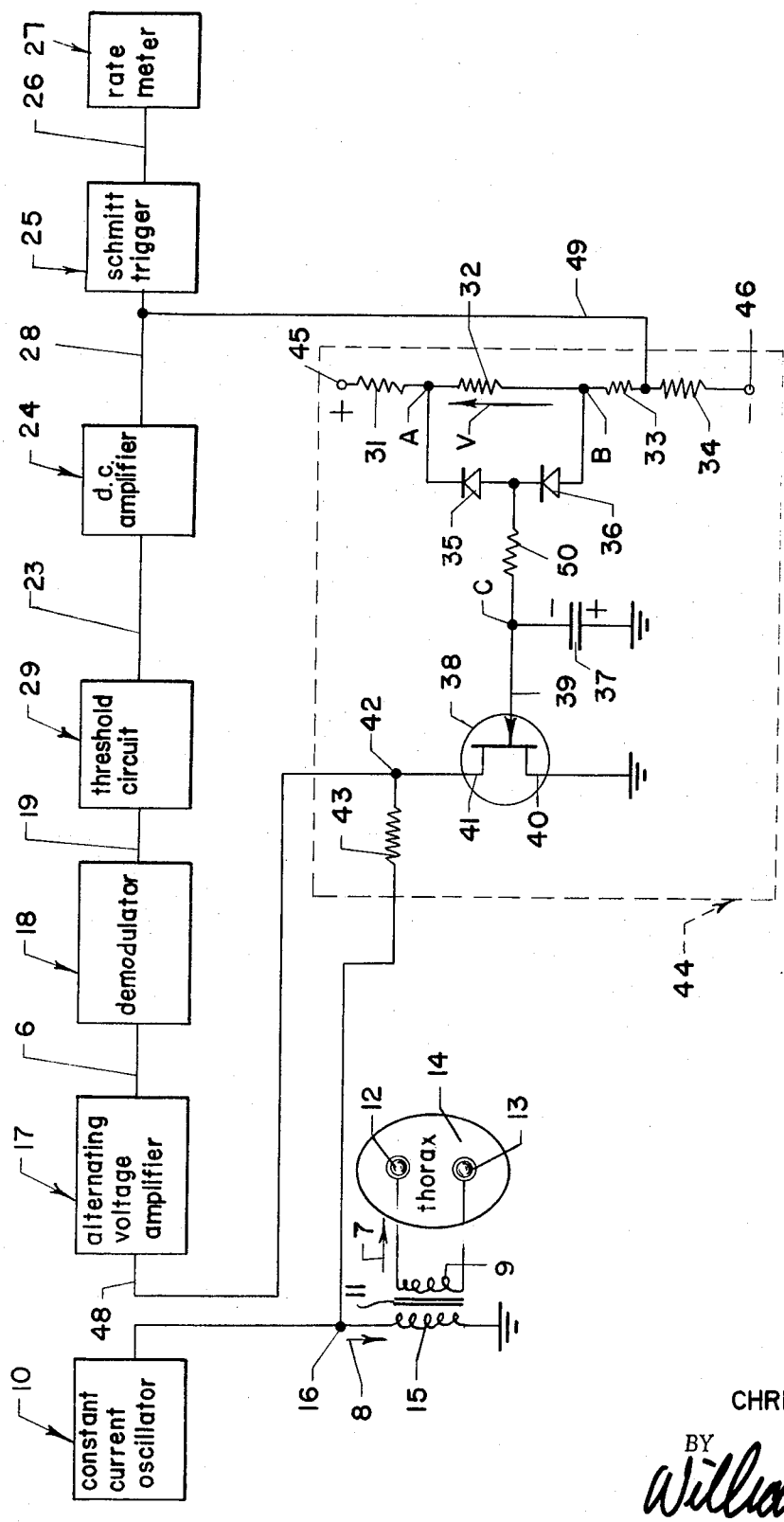
FIG. 2 is a partial block diagram of the present invention, wherein the gain compensation improvement is shown in schematic detail.

FIG. 2 is a detailed description of the present invention. A constant current oscillator 10 drives the primary winding 15 of transformer 11 whereby through transformer coupling, secondary winding 9 conducts secondary current 7 through the thorax 14 of a mammalian subject (not shown) via electrodes 12 and 13. This invention is not limited to monitoring respiration of a mammalian subject only, but can be used to monitor respiration of any living creature that breathes. The reflected impedance of the thorax 14 multiplied by the current 8 in primary winding 15 determines the primary voltage at node 16. Node 16 is conductively connected to one end of resistor 43, the other end being conductively connected at node 42 to both the alternating voltage amplifier's input 48 and the drain electrode 41 of FET 38. The circuitry associated with FET 38 will be described after a description of the signal flow through the alternating voltage amplifier 17 which follows immediately.

The voltage at the input 48 of alternating voltage amplifier 17 is a 50 KHZ carrier which is amplitude modulated by thoracic impedance changes to a typical depth of 0.5 percent. Alternating voltage amplifier 17 amplifies both the carrier component and the modulation component, and the output of amplifier 17 is conductively connected by conductor 6 to the input of de-modulator 18. De-modulator 18 removes half of the modulated carrier, for example, the negative polarity, and also filters out the carrier frequency component, providing at its output 19 a D.C. signal which varies in amplitude as a function of the modulation, the offset of which represents the carrier amplitude. This varying D.C. signal is conducted to threshold circuit 29 which removes the offset D.C. signal but passes the varying portion of the signal which comprises the modulation component, to the input 23 of D.C. amplifier 24.

As mentioned in the detailed description of the prior art, the instant invention uses threshold circuit 29, which could comprise a zener diode network, (not shown), instead of the A.C. coupling network 20 in FIG. 1. Because the pneumograph presently being discussed utilizes gain control through gain stabilizer 44 yet to be described, threshold circuit 29 is a better choice for removal of unwanted D.C. voltages than is the A.C. coupling network 20. Network 20 has a very large time constant equal to the product of its resistor 22 and capacitor 21 which allows slowly varying modulation signals to pass undistorted and unattenuated. This large time constant makes the correction time very long. This is the time required for capacitor 21 to reduce the unwanted D.C. signal to a value which is compatible with the input requirements of D.C. amplifier 24. This correction time corresponds to substantial pneumographic dead time during which the apparatus is inoperative.

Threshold circuit 29 has its level set to a value corresponding to the average de-modulated carrier voltage which is substantially held constant by gain stabilization, allowing the modulation signal to pass. The threshold circuit 29 has no inherent correction time, as there was with coupling network 20, resulting in no time period of pneumographic inoperativeness. Although gain stabilizer 44 can function with either means for removing unwanted D.C. voltages, there are obvious advantages to the choice of a threshold circuit 29 for use in a preferred embodiment of the instant invention.

The modulation component passes from the threshold circuit 29 to the input 23 of D.C. amplifier 24. D.C. amplifier 24 amplifies the modulation component to give the proper level on conductor 28 which is connected to the input of the Schmitt trigger 25 for activation thereof. D.C. amplifier 24 also amplifies any change in offset level that passes through threshold circuit 29 cue to a carrier level change as a result of a large thoracic impedance change. It is because of the amplification of this D.C. offset change, which varies the ratio between the value of the modulation component and the average value of the de-modulated carrier, that a gain stabilizer is required.

The Schmitt trigger 25 performs a squaring function on the amplified modulation signal and provides on its output conductor 26, variable width pulses of constant amplitude as a function of the modulation signal. The variable width pulses are conducted to a rate meter 27 which generates constant width pulses from them and then performs an averaging function on the latter pulses to provide a meter reading which indicates breaths per unit time, and typically breaths per minute.

Gain stabilizer circuit 44 receives one of its inputs from the output of D.C. amplifier 24 via conductive lead 49, and another input from the primary side of transformer 11. The output of stabilizer 44 provides an input to amplifier 17. Conductive lead 49 is connected to a fixed resistive voltage divider, comprised of resistors 31, 32, 33 and 34 at the junction of resistors 33 and 34. The voltage divider is supplied by positive D.C. voltage 45 and negative D.C. voltage 46. Diode 35 and diode 36 are connected in series with each other with the cathode of diode 36 connected to the anode of diode 35. The anode of diode 36 and the cathode of diode 35 are connected to opposite ends of resistor 32 respectively. Therefore, the D.C. voltage drop V which is established across resistor 32 due to current flow through the divider from positive supply 45 to negative supply 46 is of such a polarity as to impress a reverse bias voltage across diodes 35 and 36 of magnitude V, typically 3 or 4 volts.

The common point of connection of diodes 35 and 36 is conductively connected to one end of resistor 50, the other end being connected to capacitor 37 and to the gate electrode 39 of FET 38. The other end of capacitor 37 is grounded. Capacitor 37 is charged negatively with respect to ground during normal operation. Capacitor 37 does not charge or discharge through the FET 38 because of the extremely high input impedance of gate electrode 39. The only way that the voltage at node C is varied is by charging capacitor 37 through diode 35 and resistor 50 or discharging capacitor 37 through diode 36 and resistor 50. In the example being described herein, for current to flow through diode 35, the voltage at node A must be at least 0.5 volts more negative than at node C; for current to flow through diode 36, voltage at node B must be at least 0.5 volts more positive than at node C. This assumes a 0.5 volt diode conduction voltage. Since nodes A and B are constrained to both increase or decrease in voltage together, both diodes cannot conduct at the same time. In fact, neither diode conducts appreciably during normal circuit operation.

In operation, the lead 49 conducts a varying D.C. level and an occasional amplified D.C. offset voltage change from the output of D.C. amplifier 24 to the voltage divider at the junction of resistors 33 and 34. This signal varies the voltages at nodes A and B in the same direction.

For example, if the voltage at node C is −5 volts when there is no input from conductor 49 due to D.C. offset change, and the voltage at node A is −3.5 volts and the voltage at node B is −6.5 volts, then these voltages establish a 4 volt "dead band". This means that any signal from conductor 49 must raise the voltage by 2 volts at node B from −6.5 volts to −4.5 volts before diode 36 will conduct, and, that any signal from conductor 49 must lower the voltage by 2 volts at node A from −3.5 volts to −5.5 volts before diode 35 will conduct.

Therefore, amplified D.C. offset voltage on conductor 49 can cause capacitor 37 to charge more negatively with respect to ground through diode 35 or discharge to a less negative value with respect to ground through diode 36. The varying D.C. level corresponding to modulation on conductor 49 will not cause any change, since the modulation will be designed to be less than this dead band.

The maximum and minimum limits of the dead band are established by the values of the resistors 31, 32, 33 and 34. These limits are selected to be compatible with the trigger levels of the Schmitt trigger 25. That is, the maximum limit of the dead band restrains the signal output of amplifier 24 to a value of voltage which is less than the operational upper input limit of the Schmitt trigger 25. The minimum limit of the dead band restrains the signal output of amplifier 24 to a value of voltage which is greater than the operational lower input limit of the Schmitt trigger 25.

Furthermore, these dead band limits should also be selected to provide gain stabilization for values of voltage on conductor 49 which correspond to values of voltage on conductor 23 that do not exceed the linear input limits of D.C. amplifier 24.

Therefore, it can be seen that only during a transient condition corresponding to a significant change in mean thoracic impedance where the maximum or minimum dead band limits are exceeded will the voltage on capacitor 37 change.

FET 38 can be considered to be a variable resistor, whose resistance value is a function of the voltage on gate electrode 39. Therefore, the capacitor's voltage or energy controls the value of drain electrode 41 to source electrode 40 resistance. This variable resistance in conjunction with fixed resistor 43 forms a variable voltage divider, whereby the value of voltage at node 42 is a function of the drain-source resistance of FET 38. The voltage at node 42 is the input voltage of alternating voltage amplifier 17. Therefore, the capacitor's voltage or energy controls the value of input voltage to amplifier 17 and controls the overall closed loop gain, and therefore the gain of the pneumograph.

For example, if the patient rolls over in bed causing his mean thoracic impedance to double, while his respiration is being monitored through electrodes 12 and 14, the increase in D.C. offset voltage level that would be coupled through threshold circuit 29 and applied to the gain stabilizer 44 via conductor 49 would cause capacitor 37 to change in voltage causing the drain electrode to source electrode resistance of FET 38 to decrease so that the voltage divider action between resistor 43 and FET 38 would correct the carrier signal peak amplitude input to amplifier 17 so as to maintain a constant de-modulator output 19. The gain correction is made in a fraction of a second, not subject to the long stabilizing constants of an ordinary low frequency AGC circuit.

When there is no correction to be made by gain stabilizer 44, it in essence breaks the circuit loop, being "de-coupled" by the dead band of diodes 35 and 36.

The preferred embodiment of my invention and the best mode now known include the following component values:

| Resistor 31 | 62K |
| 32 | 10K |
| 33 | 10K |
| 34 | 5.1K |
| 43 | 33K |
| 50 | 1 Meg |
| Diodes 35 | FD 333 |
| 36 | FD 333 |
| FET 38 | 2N4302 |
| Capacitor 37 | 5 uf. |
| Voltage Supply 45 | +15 volts D.C. |
| 46 | −15 volts D.C. |

ALTERNATIVE EMBODIMENT

Figure 3:
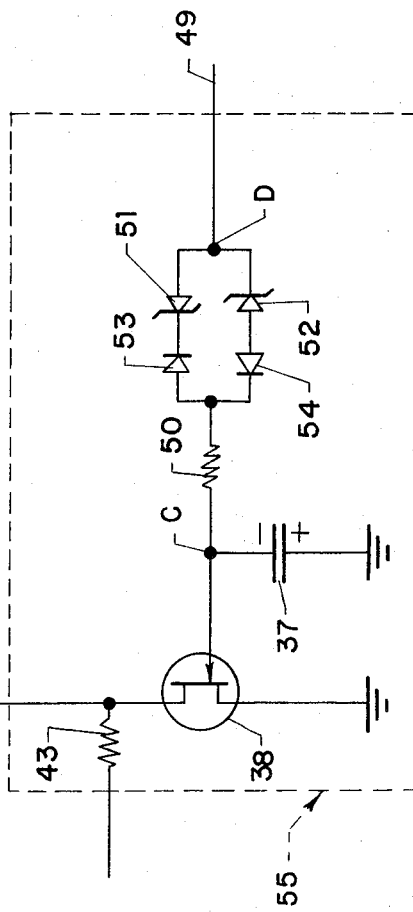
FIG. 3 is a schematic diagram of an alternative embodiment of the present invention.

An alternative embodiment is shown in FIG. 3, which is a schematic diagram of a gain stabilizer. Some of the components of this gain stabilizer are different, but all of the peripheral signal processing circuitry remains unchanged.

In place of resistors 31, 32, 33, 34 and diodes 35 and 36, all referenced in FIG. 2, the following components are substituted as shown in FIG. 3: diodes 53 and 54, and zener diodes 51 and 52.

The voltage fluctuates as previously described on conductor 49 in response to respiration and/or large thoracic impedance changes. Zener diode 51 will not conduct current from node C to node D unless the voltage at node D is less than the voltage at node C at least by 0.5 volts plus the zener threshold voltage of zener diode 51. Current flow from node C to node D permits capacitor 37 to charge more negatively. Diode 53 prevents any current flow from node D to C through zener diode 51, which otherwise would have occurred when node D's voltage was 0.5 volts higher than node C's voltage.

Zener diode 52 will not conduct current from node D to node C unless the voltage at node D is greater than the voltage at node C at least by 0.5 volts plus the zener threshold voltage of zener diode 52. Current flow from node D to node C permits capacitor 37 to charge more positively. Diode 54 prevents any current flow from node C to D through zener diode 52 which otherwise would have occurred when node C's voltage was 0.5 volts higher than node D's voltage.

A "dead band" is established as before, which is equal to one volt plus double the zener threshold voltages. This assumes that diodes 53 and 54 each have a 0.5 volt forward voltage drop, and that the two zener threshold voltages are equal, and that the non-breakdown region of the zener diodes 51 or 52 is much higher in impedance than resistor 50.

Therefore, gain stabilizer 55 in FIG. 3 is an alternative embodiment and an exact functional replacement of gain stabilizer 44 in FIG. 2.

From the two embodiments of my invention disclosed herein, it will be understood that other changes can be made in the details, arrangement of components, and components themselves without departing from the spirit and scope of the invention as defined by the appended claims.

I claim:

1. An impedance pneumograph comprising electrode means adopted for attachment to a breathing subject, means for generating a fixed-amplitude carrier signal, means connected to said electrode means and to said carrier signal generating means for deriving a modulated carrier signal in accordance with the impedance between said electrode means when attached to a breathing subject, AC amplifying means for amplifying said modulated carrier signal and demodulating it to produce a DC signal representative of the impedance between said electrode means when attached to a breathing subject, rate indicator means connected to receive said DC signal and indicate mean breathing rate, and feedback means responsive to said DC signal for varying the gain of said AC amplifying means in a direction to counteract changes in said DC signal, said feedback means including threshold detecting means for preventing a change in the gain of said AC amplifying means whenever the amplitude of said DC signal is within predetermined upper and lower limits.

2. An impedance pneumograph in accordance with claim 1 wherein said carrier signal generating means includes means for generating a constant-current carrier signal, said modulated carrier signal deriving means includes means for deriving a signal at the frequency of said carrier signal and whose amplitude is proportional to the impedance between said electrode means when attached to a breathing subject, and said AC amplifying means includes variable divider means at the input thereof for attenuating the modulated carrier signal by a factor determined by said feedback means.

3. An impedance pneumograph in accordance with claim 2 wherein said variable divider means includes capacitor means, resistor means, transistor means, said resistor means and said transistor means being connected in series with said modulated carrier signal being applied to one end of the series circuit and the junction of said resistor means and said transistor means representing thereon the attenuated modulated carrier signal, said capacitor means being connected to said transistor means for controlling the impedance thereof, and said feedback means includes means for charging and discharging said capacitor means in accordance with the amplitude of said DC signal when it is outside the bounds of said upper and lower limits.

4. An impedance pneumograph in accordance with claim 3 wherein said threshold detecting means includes first and second diode means connected to said capacitor means in oppositely poled directions for respectively controlling the charging and discharging of said capacitor means when the amplitude of said DC signal is outside the bounds of said upper and lower limits.

5. An impedance pneumograph in accordance with claim 1 wherein said AC amplifying means includes a stage having capacitor means, resistor means, transistor means, said resistor means and said transistor means being connected in series with said modulated carrier signal being applied to the input of the stage at one end of the series circuit and the output of the stage being taken at the junction of said resistor means and said transistor means, said capacitor means being connected to said transistor means for controlling the impedance thereof, and said feedback means includes means for charging and discharging said capacitor means in accordance with the amplitude of said DC signal when it is outside the bounds of said upper and lower limits.

6. An impedance pneumograph in accordance with claim 5 wherein said threshold detecting means includes first and second diode means connected to said capacitor means in oppositely poled directions for respectively controlling the charging and discharging of said capacitor means when the amplitude of said DC signal is outside the bounds of said upper and lower limits.

7. An impedance pneumograph in accordance with claim 6 wherein said capacitor means is connected to said transistor means such that the voltage thereacross remains substantially constant in the absence of the conduction of said first and second diode means.

8. An impedance pneumograph in accordance with claim 1 wherein said carrier signal generating means includes means for generating a constant-current carrier signal, and said modulated carrier signal deriving means includes means for deriving a signal at the frequency of said carrier signal and whose amplitude is proportional to the impedance between said electrode means when attached to a breathing subject.

9. An impedance pneumograph in accordance with claim 1 wherein said feedback means includes capacitor means for varying the gain of said AC amplifying means in accordance with the voltage thereacross, and oppositely poled first and second diode means connected to said capacitor means for respectively charging and discharging said capacitor means when the amplitude of said DC signal is outside the bounds of said upper and lower limits.

10. An impedance pneumograph in accordance with claim 9 wherein said capacitor means is connected to said AC amplifying means such that the voltage thereacross remains substantially constant in the absence of the conduction of said first and second diode means.

11. An impedance pneumograph in accordance with claim 10 further including biasing means connected to each of said first and second diode means for inhibiting the conduction thereof until the difference between the voltage across said capacitor means and the amplitude of said DC signal exceeds a respective predetermined threshold value.

* * * * *